(12) United States Patent
Li

(10) Patent No.: US 7,337,231 B1
(45) Date of Patent: Feb. 26, 2008

(54) PROVIDING MEDIA ON DEMAND

(75) Inventor: Fulu Li, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 816 days.

(21) Appl. No.: 09/739,066

(22) Filed: Dec. 18, 2000

(51) Int. Cl.
*G06F 15/16* (2006.01)

(52) U.S. Cl. ...................................... 709/231; 709/232

(58) Field of Classification Search ................ 709/228, 709/230–233; 380/210; 725/86, 97, 98, 725/101
See application file for complete search history.

(56) References Cited

U.S. PATENT DOCUMENTS

| | | | | |
|---|---|---|---|---|
| 5,421,031 | A | * | 5/1995 | De Bey ........................ 725/92 |
| 5,991,308 | A | * | 11/1999 | Fuhrmann et al. ..... 370/395.53 |
| 6,502,139 | B1 | * | 12/2002 | Birk et al. ................... 709/233 |
| 6,504,990 | B1 | * | 1/2003 | Abecassis ..................... 386/46 |

OTHER PUBLICATIONS

Kien A. Hua, Y. Cai, and Simon Sheu, "Exploiting Client Bandwidth for More Efficient Video Broadcast". Proc. Int'l on Computer Communications and Networks, Oct. 1998, pp. 848-856.
Despina Saparilla, Keith W. Ross, and Martin Reisslein, "Periodic Broadcasting with VBR-Encoded Video". IEEE INFOCOM '99, The Conference on Computer Communications, vol. 2, Mar. 1999, pp. 464-471.
Kevin C. Almeroth, and Mostafa H. Ammar, "On the Use of Multicast Delivery to Provide a Scalable and Interactive Video-on-Demand Service". Journal on Selected Areas of Communication, Aug. 1996, pp. 2-23.

Fulu Li and Ioanis Nikolaidis, "Trace-Adaptive Fragmentation for Periodic Broadcast of VBR Video". http://www.nossdav.org/, Jun. 1999.
O. Rose, "Statistical properties of MPEG video traffic and their impact on traffic modeling in ATM systems". http://nero.informatik.uni-wuerzburg.de/TR/, Feb. 1995, Report No. 101, pp. 1-25.
Martin Reisslein and Keith W. Ross, "Join-the-Shortest-Queue Prefetching for VBR Video on Demand". In Proceedings of IEEE International Conference on Network Protocols, Jan. 1997, pp. 1-33.

* cited by examiner

*Primary Examiner*—Nathan Flynn
*Assistant Examiner*—Mohammad Siddiqi
(74) *Attorney, Agent, or Firm*—Guerin & Rodriguez, LLP.; Michael A. Rodriguez

(57) ABSTRACT

Providing media on demand includes a trace-adaptive fragmentation scheme generating a plurality of segment fragmentation schemes for broadcasting data on a link across a network from a host to a set of clients. The set of data includes frames of information and can include media-on-demand, such as video-on-demand. The trace-adaptive fragmentation scheme considers a characteristic of the data in generating the plurality of segment fragmentation schemes. The trace-adaptive fragmentation scheme also selects one of the plurality of segment fragmentation schemes to use in broadcasting the data to the set of clients for each item of data included in the data. In selecting a segment fragmentation scheme for each item of data, the trace-adaptive fragmentation scheme attempts to reduce data loss in broadcasting the data to the set of clients and considers whether a segment fragmentation scheme reduces a gap between a peak aggregate rate of the data broadcast to the client and a minimal aggregate rate of the data broadcast to the client for simultaneously broadcast segments of data.

45 Claims, 14 Drawing Sheets

| $s_m^1$ | $s_m^2$ | $s_m^3$ | $s_m^4$ | $s_m^5$ | $s_m^6$ | Feasible? |
|---|---|---|---|---|---|---|
| 1 | 1 | 1 | 1 | 1 | 1 | No |
| 1 | 1 | 1 | 1 | 1 | 2 | No |
| 1 | 1 | 1 | 1 | 1 | 3 | No |
| 1 | 1 | 1 | 1 | 2 | 2 | No |
| 1 | 1 | 1 | 1 | 2 | 3 | No |
| 1 | 1 | 1 | 1 | 2 | 4 | No |
| 1 | 1 | 2 | 2 | 2 | 2 | No |
| 1 | 1 | 2 | 2 | 2 | 3 | No |
| 1 | 1 | 2 | 2 | 2 | 6 | No |
| 1 | 1 | 2 | 2 | 4 | 4 | No |
| 1 | 1 | 2 | 2 | 4 | 6 | No |
| 1 | 1 | 2 | 2 | 4 | 8 | No |
| 1 | 1 | 3 | 3 | 3 | 3 | No |
| 1 | 1 | 3 | 3 | 3 | 6 | No |
| 1 | 1 | 3 | 3 | 3 | 9 | No |
| 1 | 1 | 3 | 3 | 6 | 6 | No |
| 1 | 1 | 3 | 3 | 6 | 9 | No |
| 1 | 1 | 3 | 3 | 6 | 12 | No |
| 1 | 2 | 2 | 2 | 2 | 2 | No |
| 1 | 2 | 2 | 2 | 2 | 4 | No |
| 1 | 2 | 2 | 2 | 2 | 6 | No |
| 1 | 2 | 2 | 2 | 4 | 4 | No |
| 1 | 2 | 2 | 2 | 4 | 6 | No |
| 1 | 2 | 2 | 2 | 4 | 8 | No |
| 1 | 2 | 3 | 3 | 3 | 3 | No |
| 1 | 2 | 3 | 3 | 3 | 6 | No |
| 1 | 2 | 3 | 3 | 3 | 9 | No |
| 1 | 2 | 3 | 3 | 6 | 6 | No |
| 1 | 2 | 3 | 3 | 6 | 9 | No |
| 1 | 2 | 3 | 3 | 6 | 12 | Yes $(F_m^1)$ |
| 1 | 2 | 4 | 4 | 4 | 4 | No |
| 1 | 2 | 4 | 4 | 4 | 8 | No |
| 1 | 2 | 4 | 4 | 4 | 12 | Yes $(F_m^2)$ |
| 1 | 2 | 4 | 4 | 8 | 8 | Yes $(F_m^3)$ |
| 1 | 2 | 4 | 4 | 8 | 12 | Yes $(F_m^4)$ |
| 1 | 2 | 4 | 4 | 8 | 16 | Yes $(F_m^5)$ |

FIG. 2

| | | $F_m^1$ | | $F_m^2$ | | $F_m^3$ | | $F_m^4$ | | $F_m^5$ |
|---|---|---|---|---|---|---|---|---|---|---|
| | Video Trace | Peak Bitrate | Client Peak | Peak Bitrate | Client Peak | Peak Bitrate | Client Peak | Peak Bitrate | Client Peak | Peak Bitrate | Client Peak |
| 702a | mtv_1 | 14.84 | 11.89 | 10.14 | 8.05 | 10.15 | 8.05 | 16.48 | 10.09 | 10.02 | 7.389 |
| 702b | mtv_2 | 11.32 | 9.52 | 9.85 | 8.54 | 9.85 | 8.54 | 14.31 | 9.76 | 10.27 | 7.08 |
| 702c | race | 12.54 | 8.43 | 11.11 | 7.07 | 10.48 | 7.07 | 16.71 | 9.09 | 10.99 | 7.76 |
| 702d | talk_1 | 8.51 | 6.01 | 7.91 | 5.38 | 7.44 | 4.91 | 13.66 | 7.14 | 7.35 | 5.43 |
| 702e | talk_2 | 7.79 | 5.03 | 7.17 | 4.45 | 6.19 | 4.40 | 12.26 | 6.35 | 6.86 | 4.52 |
| 702f | simpsons | 10.13 | 6.90 | 9.59 | 6.92 | 9.59 | 6.92 | 14.61 | 8.14 | 10.10 | 7.25 |
| 702g | terminator | 5.41 | 3.50 | 4.49 | 3.02 | 4.14 | 3.02 | 7.89 | 4.57 | 5.01 | 3.21 |
| 702h | soccer_1 | 12.02 | 8.88 | 10.95 | 7.07 | 10.12 | 7.07 | 17.80 | 9.81 | 10.55 | 6.67 |
| 702i | soccer_2 | 9.99 | 8.35 | 10.27 | 7.35 | 9.97 | 7.36 | 15.19 | 9.23 | 13.73 | 8.76 |
| 702j | news.2 | 8.60 | 6.96 | 7.91 | 5.71 | 7.69 | 5.71 | 14.22 | 8.37 | 9.17 | 6.78 |

FIG. 7

PROVIDING MEDIA ON DEMAND

BACKGROUND

This invention relates to providing media on demand.

Media-on-demand (MoD) systems provide media services in which a user can request over a network a media object from a media server. For example, in a pure video-on-demand (VoD) system, a user at a device connected to the Internet can request from a media server connected to the Internet any video content of his or her choice at any time and almost immediately begin watching the video on the device. The device can be any device capable of connecting to the Internet and downloading, decoding, and playing the video content, such as a stationary or mobile computer, a telephone, a personal digital assistant, and a television.

A number of techniques can deliver VoD, including batched multicast and periodic broadcasting. Batched multicast schemes include collecting ("batching") user requests for a particular video stream over successive time intervals. Users requesting the same video stream during the same time interval receive the video stream through a single multicast of the entire video. The time intervals can be long because the maximum start-up latency experienced by a user is the length of the video divided by the number of copies of the video that can be simultaneously transmitted for a common link capacity. Start-up latency, also called service latency or playout latency, is the delay between the time a user requests a video and the time the video is actually played at the user side. For example, if the time interval is five minutes for a two hour long video, batched multicasting may result in as many as twenty-four concurrent multicasts of the same video (120 minutes divided by five minutes equals twenty-four).

Periodic broadcasting schemes include periodically broadcasting entire videos. Periodic broadcasting bypasses the need to process individual user requests for a video because the transmission schedules used for a periodic broadcast are determined off-line. The periodically broadcast videos can be encoded with a constant bit rate (CBR) approach or with a variable bit rate (VBR) approach. With CBR encoding, a video is transmitted at a constant, uniform transmission rate. With VBR encoding, such as Moving Pictures Experts Group series one (MPEG-1) and MPEG series two (MPEG-2), a video is transmitted at variable transmission rates. VBR encoding can use less average bandwidth than CBR encoding for the same image video and the same quality.

Depending on the periodic broadcasting scheme, the video may be transmitted as one complete unit or as separate, fragmented segments. The start-up latency with periodic broadcasting depends not on user requests like batched broadcasting, but on the type of periodic broadcasting scheme used and the number of videos to be transmitted. For example, if the video is broadcast as a whole in its entirety, the maximum start-up latency for ten movies, each encoded at three megabits per second (Mbps), each two hours long, and all broadcast over a 155 Mbps link, is approximately twenty-four minutes. This means that a user may have to wait up to twenty-four minutes between requesting any of the ten movies and receiving the video on his or her device.

If the video is broadcast in segments, all of the segments are broadcasted periodically, each segment in a separate stream. Once the first segment of a video is available to be downloaded and played at the user side, continuous playout of the entire video can begin according to the timing constraints of the broadcast segment schedules. The segments for a particular video are collectively called a broadcast series. The lengths of the segments in a video are typically of equal size or are integer multiples of the length of the first segment. In a broadcast series, the first segment may be short such that its broadcast can be repeated often, tending to lower playout latency. Video frames within from all of the simultaneously broadcast streams are multiplexed into a single link to a network without buffering. Bits sent along the link may be lost if the aggregate traffic of the simultaneously broadcast streams on the link exceeds the link's capacity.

SUMMARY

According to an aspect of the present invention, providing media on demand includes generating multiple segment fragmentation schemes for broadcasting data to a set of clients, considering a characteristic of the data in generating the multiple segment fragmentation schemes, and selecting one of the multiple segment fragmentation schemes for each item of data included in the data to use in broadcasting the data to the set of clients.

According to another aspect of the present invention, a system includes a client configured to receive data from a transmission line. The system also includes a host configured to generate multiple segment fragmentation schemes for broadcasting data to the client, consider a characteristic of the data in generating the multiple segment fragmentation schemes, select one of the multiple segment fragmentation schemes for each item of data included in the data to use in broadcasting the data to the client, and deliver the data to the client via the transmission line.

According to another aspect of the present invention, providing media on demand includes generating a plurality of segment fragmentation schemes for transmitting a set of data to a client, considering in the generating an amount of time that it takes for a first segment in an item of data included in the set of data to reach the client, a maximum number of data streams that the client can simultaneously receive, and a maximum number of data streams that a host of the set of data can transmit for each item of data included in the set of data. One of the plurality of segment fragmentation schemes is selected for each item of data included in the set of data, considering in the selecting an amount of data lost in transmitting the set of data to the client under each of the plurality of segment fragmentation schemes.

One or more of the following advantages may be provided by one or more aspects of the invention.

Due to high bit rate variability of VBR-encoded media contents, different fragmentation schemes can lead to different aggregate traffic shapes when multiplexing periodically-broadcast segments together, resulting in different data loss performance. Trace-adaptive fragmentation (TAF) takes the traffic of the particular media into account and derives fragmentation schemes that reduce data loss performance over rigid fragmentation techniques. The TAF process can consider a number of constraints in deriving the fragmentation schemes, including playout latency, a maximum number of streams that a client can simultaneously download, a maximum number of segments that a source of the media can simultaneously transmit to a client, and continuous play-out. TAF selects one of a number of the derived fragmentation schemes, selecting the fragmentation scheme that reduces data loss that occurs due to limited broadcast link capacity.

In choosing a fragmentation scheme for a plurality of media streams to be broadcast over a single communication link, the fragmentation scheme for a particular media may be selected so as to reduce the gap between the aggregate peak bit rate and the minimal aggregate bit rate of the simultaneously broadcast segments for that media stream. In this way, the aggregate traffic will become more smooth, reducing packet loss. Additionally, in choosing a fragmentation scheme for each media stream, the packet loss in multiplexing all of the media streams together can be computed and a fragmentation scheme can be chosen for each media stream so as to reduce packet loss.

TAF generates fragmentation schemes off-line (or on-line) to exploit a client's available bandwidth. Thus, a client can simultaneously download data from more than one broadcast stream because the TAF scheme can consider only that portion of the client's bandwidth not already accounted for. In this way, playout latency can be reduced without requiring more buffer space at the client end by more efficiently arranging the data being downloaded to the client. Further, the client can be provided a certain quality of service (QoS) through the TAF scheme's consideration of various constraints, e.g., maximum playout latency, maximum data loss rate, etc, in deriving and selecting a fragmentation scheme. In that way, the TAF scheme can also provide high-quality images to the client.

Other features will become apparent from the following description and from the claims.

DESCRIPTION OF DRAWINGS

FIG. 2 is a table showing sample generated fragmentations.

FIG. 7 is a table showing bit rates for video traces.

DETAILED DESCRIPTION

Figure 1:
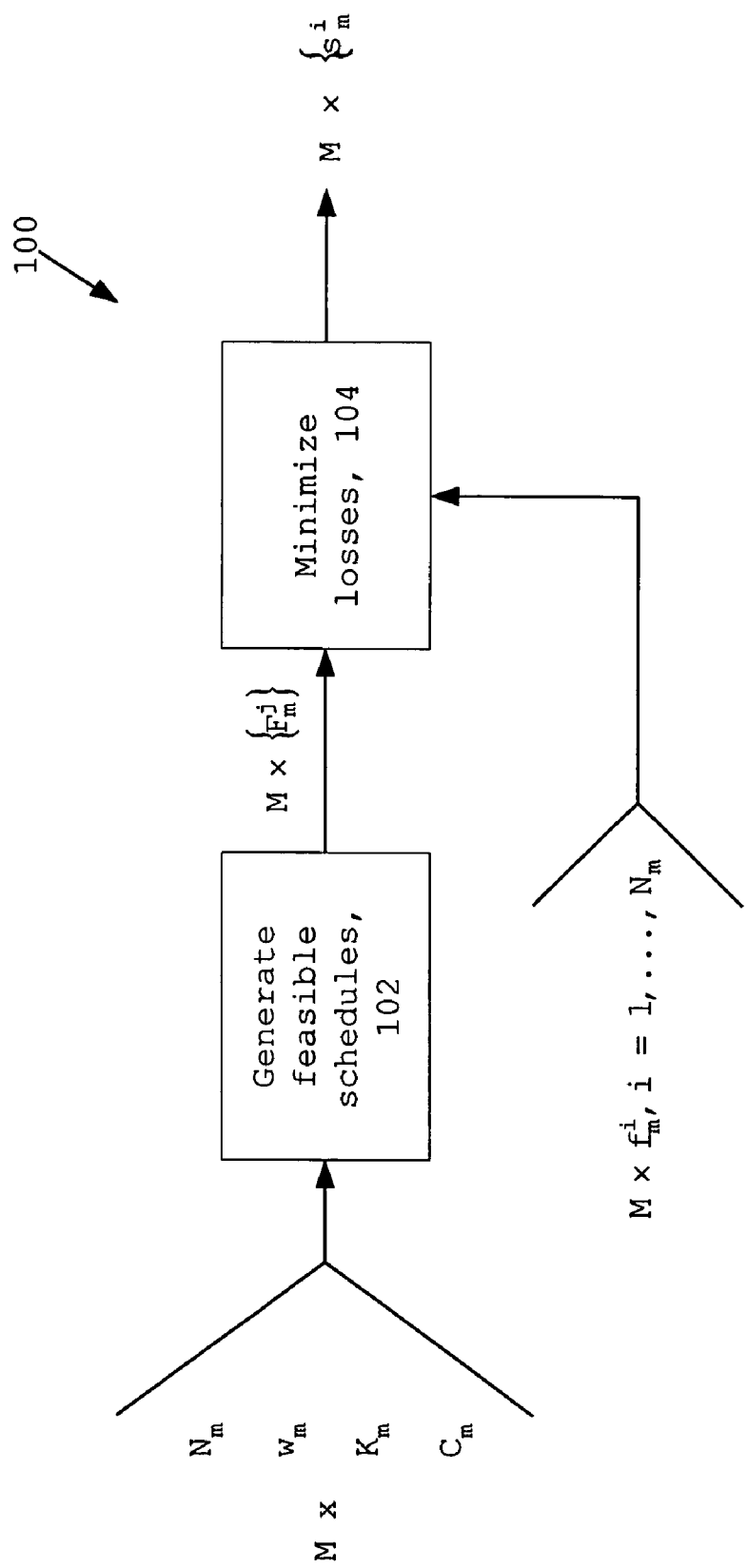
FIG. 1 is a block diagram showing a fragmentation technique.

Referring to FIG. 1, a process 100 of trace-adaptive fragmentation (TAF) is shown. The process 100 generates 102 multiple broadcast schedules (fragmentations) for M sets of data to be delivered from a host to a client (or group of clients) on a link across a network such as the Internet. M represents an integer number, indicating the number of sets of data considered by the process 100. Each set of data includes frames of information and can include media-on-demand (MoD), video-on-demand (VoD), news-on-demand (NoD), distance learning, home shopping, training programs, and other types of similar information. VoD is discussed below, where one set of data includes one video, although the discussion can apply to any of these or other data types.

In generating the fragmentations, the process 100 can consider one or more input constraints of the host, the client, and/or the network for each of the M videos, including a maximum playout latency ($w^m$), a maximum number of streams ($C_m$) that the client can simultaneously download from the host, the network, other hosts, and/or other networks, a maximum number of segments ($K_m$) that the host can simultaneously transmit for each video, and a continuity condition that ensures that the client receives continuous play-out of a set data once play-out of the video starts. $K_m$ limits the bandwidth allocated by the host for the $m^{th}$ video. Similarly, $C_m$ limits the necessary bandwidth for the client. The process 100 can also consider $N_m$, where m ranges from one to M and N represents the video sequence for the $m^{th}$ video.

Figure 3:
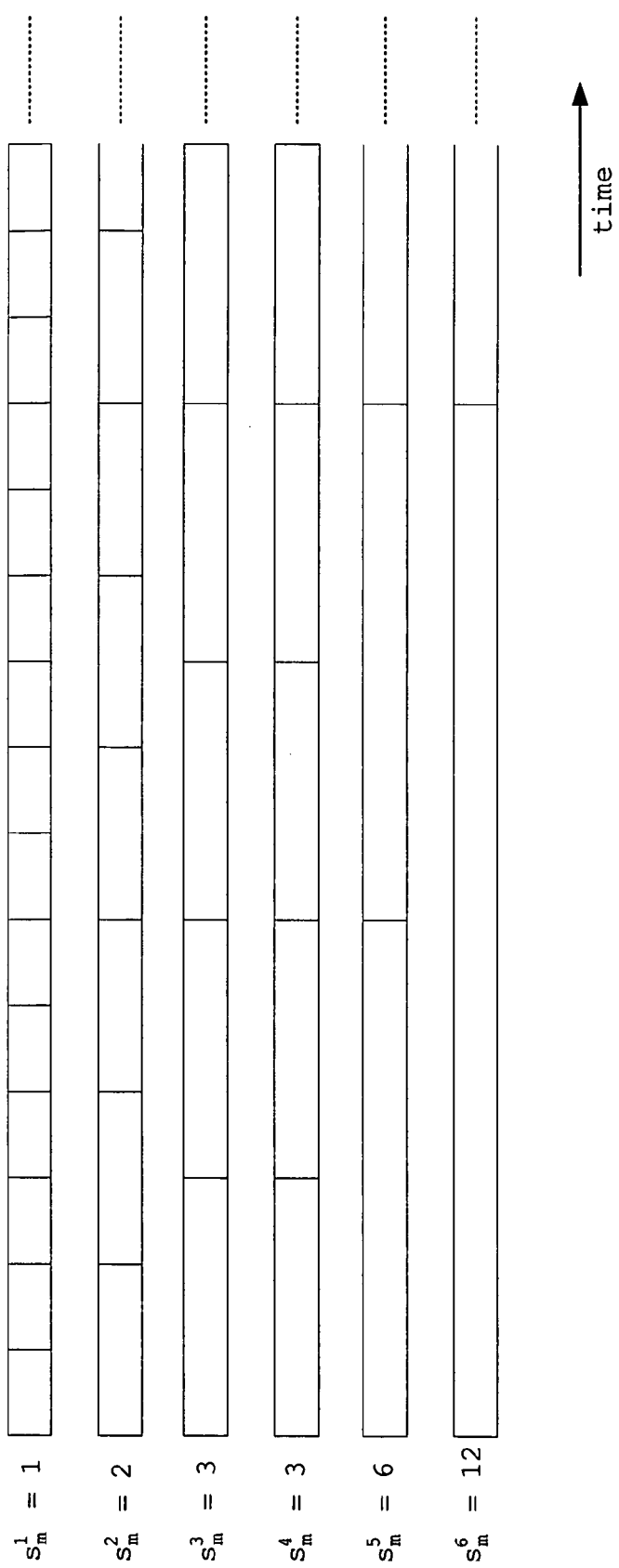
FIG. 3 is a block diagram showing segment flow.

Referring to FIG. 2, a table 200 shows generated fragmentations in an example run of the process 100 for the $m^{th}$ video m, one of the M videos. (Generated fragmentations for different videos can vary from the fragmentations shown in the table 200.) The $m^{th}$ video broadcast series is represented by $\{s_m^1, s_m^2, \ldots, s_m^{K_m}\}$ where $s_m^1$ equals one and all other $s_m^i$ are normalized relative to one. Five feasible fragmentations are found for the $m^{th}$ video: $F_m^1$, $F_m^2$, $F_m^3$, $F_m^4$, and $F_m^5$. Feasible fragmentations are those generated fragmentations that satisfy the input constraints. These feasible fragmentations are collectively denoted as $F_m^j$. FIG. 3 illustrates the segments as included in one of the feasible broadcast series, $F_m^1$. The process 100 generates feasible schedules as illustrated in FIG. 2 for each of the M videos.

The process 100 selects 104 one of the generated feasible fragmentations for each of the M videos from the feasible fragmentations $F_m^j$ generated for that video. In selecting a fragmentation, the process 100 considers the number of bits in each frame (f) of each of the videos, where $f_m^i$ indicates the number of bits in the $i^{th}$ frame of the $m^{th}$ video. The process 100 selects a fragmentation for each video to reduce data loss for the combined traffic of all the videos under their respective selected fragmentations, e.g., by selecting the fragmentation that provides the lowest data loss for the combined traffic of all the videos under their respective selected fragmentations. The selection results in a broadcast series (s) for each of the M videos, where $s_m^i$ indicates the $i^{th}$ segment of the $m^{th}$ video and i ranges from one to $K_m$.

The M videos are multiplexed on the same link having a bandwidth equal to B (in Mbps) using, e.g., group-of-picture (GOP) smoothing, buffered statistical multiplexing, join-the-shortest queue (JSQ) prefetching, or other multiplexing technique. Each of the M videos has a frame rate of F (in frames per second (fps)), where the total amount, size, and order of frames in each of the M videos is known a priori, i.e., at the beginning of the process 100. Each of the M videos is divided into $K_m$ segments before broadcasting. The host simultaneously broadcasts $\Sigma_{m=1}^M K_m$ video streams, one segment per video. Frames from $\Sigma_{m=1}^M K_m$ channels are multiplexed into the single broadcast link without buffering. Bits are lost whenever the aggregate broadcast traffic rate exceeds the link capacity. The host broadcasts each of the M videos at a frame rate of F fps, the consumption rate of the videos, e.g., 25 fps.

Each segment is broadcast on a separate logical channel. A logical channel is a single physical link used to convey multiple flows of data. Hence, the link capacity is split into multiple logical channels. For CBR-encoded video and logical channels of equal capacity, time division multiplexing can be used, for example, to share the physical link. If the logical channels are of different but constant bandwidths, then, for example, a fair queuing scheduler can be used to share the physical link. In the case of variable bandwidth per logical channel, as with VBR-encoded video, the sharing can be achieved through, for example, statistical multiplexing. Depending on the scheme used to share the physical link, a corresponding jitter absorption scheme may be necessary at the receiver (client). Given that the multiplexing discussed with reference to the process 100 is bufferless, no jitter absorption is necessary.

Additionally, in the construction of a periodic broadcasting schedule, several choices exist for optimization criteria, such as the reduction of server bandwidth, the reduction of client buffer size, and the reduction of overflow traffic beyond the link capacity when traffic segments are aggregated. The process 100 focuses of the reduction of overflow traffic beyond the link capacity when traffic segments are aggregated, although the process 100 still captures other relevant constraints, i.e., the constraints stemming from the synchronization between segments and the hardware capabilities of the server and clients.

A client begins to receive a requested video at the host's broadcast of the first segment occurring after the client requests the video. The client concurrently displays frames of the video from the beginning of the first segment. The client downloads the remaining video segments according to a download strategy.

The download strategy depends on the number of channels ($C_m$) that can be simultaneously received by the client. Part of the download strategy is that if a segment size exceeds the size of the segment following it ("the next segment"), the next segment can be downloaded prior to being needed for play-out at the client, resulting in overhead in terms of disk space and disk bandwidth. In this sense, an inherent conflict exists between start-up delay constraints and disk space or disk bandwidth constraints. If these constraints are tight/narrow, no schedule may exist that can simultaneously satisfy all of them.

Figure 4A:
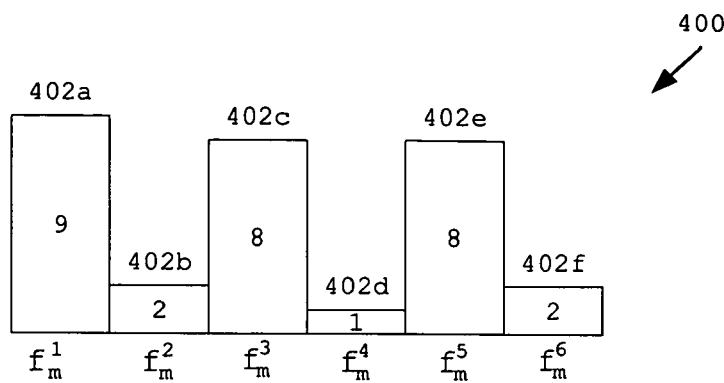
FIG. 4A illustrates a video frame sequence.
Figure 4B:
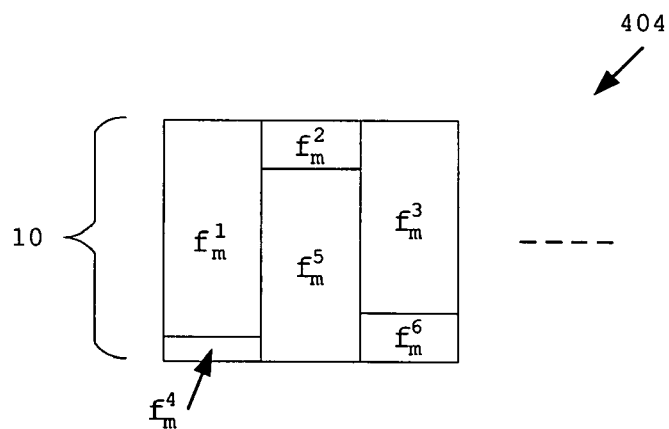
FIGS. 4B-C illustrate fragmentation schemes for the video frame sequence of FIG. 4A.
Figure 4C:
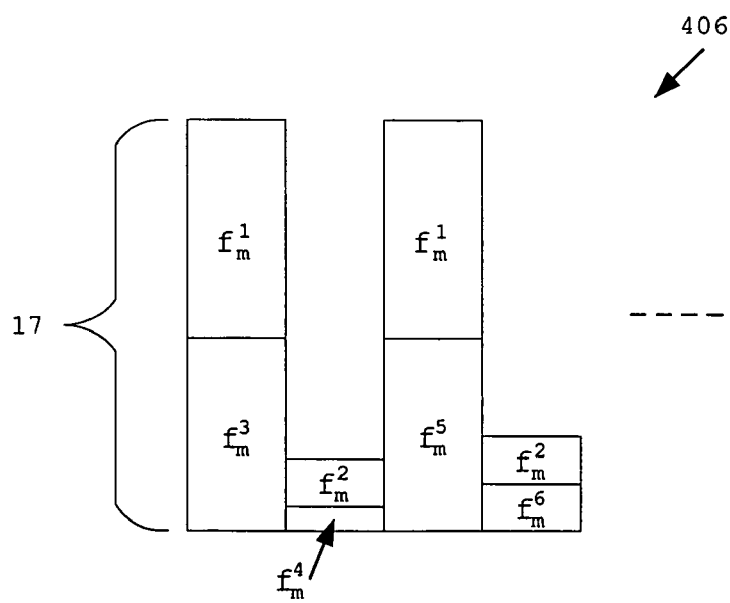

Referring to FIGS. 4A-C, due to bit rate variability in VBR-encoded video, different fragmentation schemes of a video sequence can lead to different aggregate traffic shape when multiplexing the periodically broadcast segments together, resulting in different data loss rates. For example, a video sequence 400 includes six segments 402a-f with frame sizes varying from one to nine. One fragmentation scheme 404 shows one round of periodic broadcast for the video sequence 400 with an aggregate peak of ten frames and a broadcast series of {1,1}. Another fragmentation scheme 406 shows one round of periodic broadcast for the video sequence 400 with an aggregate peak of seventeen frames and a broadcast series of {1,2}. Either broadcast schedule 404, 406 can be used to transmit the VBR-encoded video. However, the fragmentation schemes 404, 406 have different aggregate traffic patterns depending on the lengths of the segments in each broadcast. These differing aggregate traffic patterns can lead to different data loss rates over a broadcast link for the fragmentation schemes 404, 406. Subsequently, one fragmentation scheme 404, 406 may be preferable over the other, and only one would be selected by the process 100.

Figure 5A:
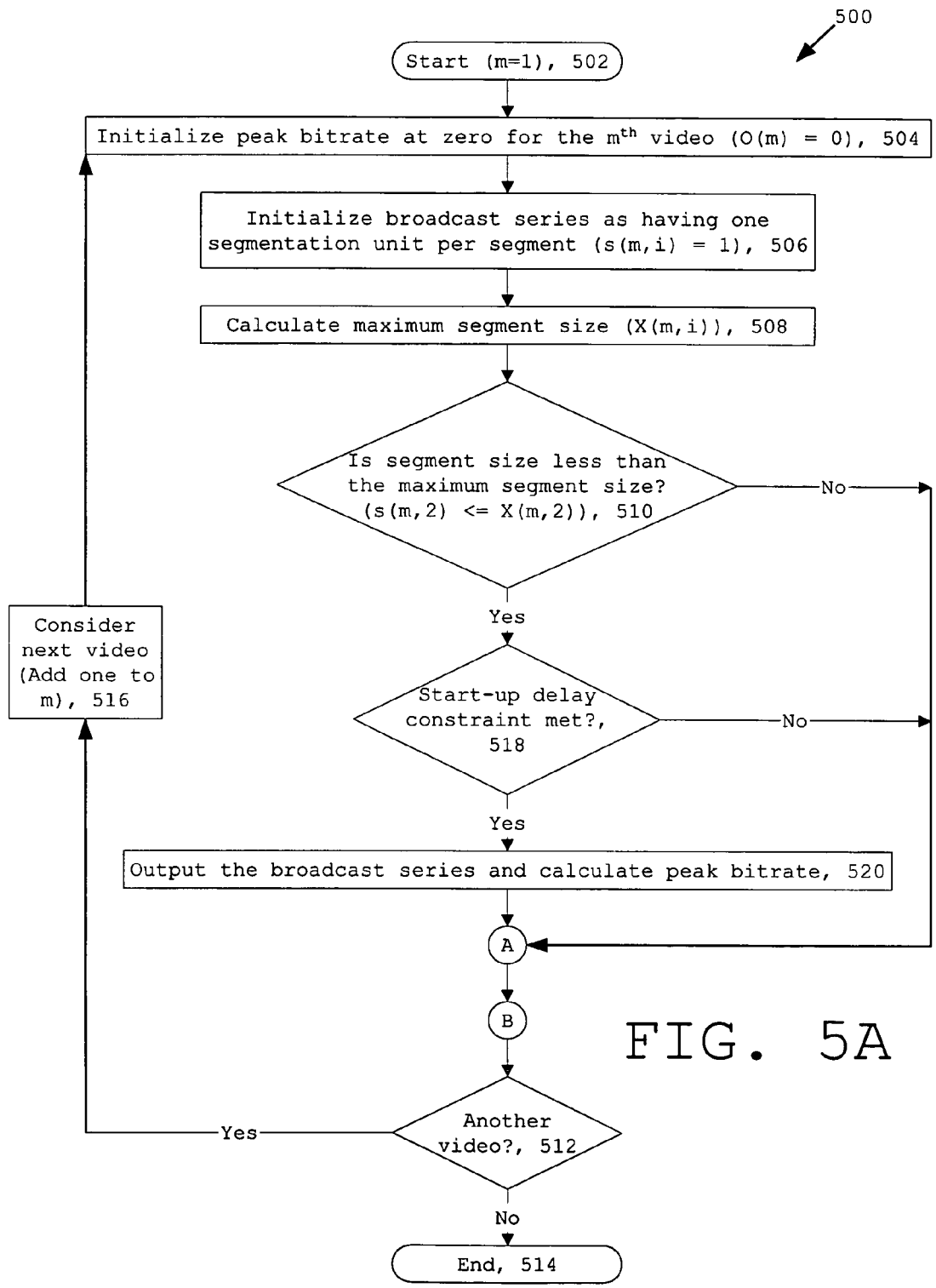
FIGS. 5A-B are flowcharts of a fragmentation generation technique.
Figure 5B:
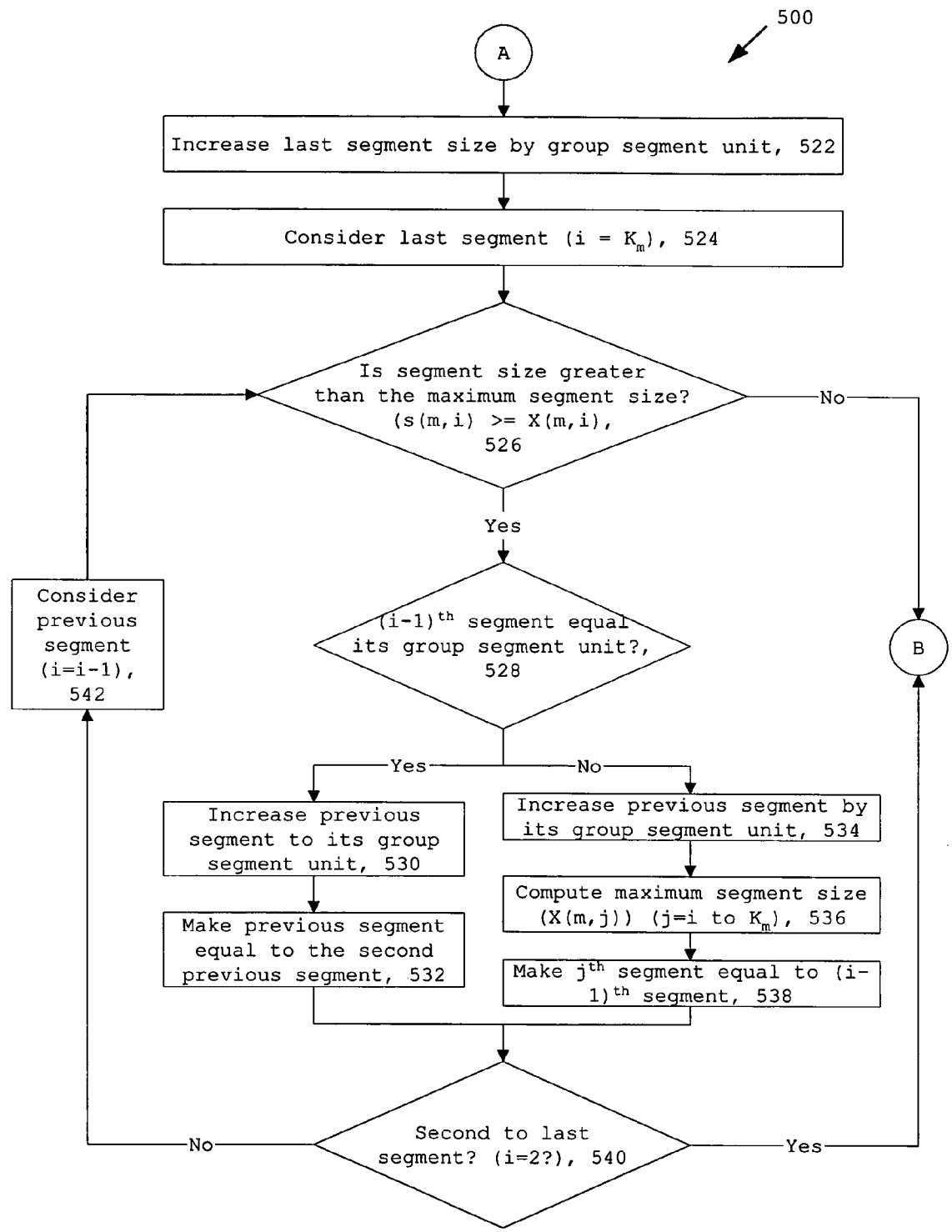

Referring to FIGS. 5A-B, another TAF process 500 is shown. The process 500 generates all possible broadcast series that can guarantee one or more input constraints for each of M videos. The input constraints to the process 500 include $K_m$, $C_m$, $N_m$, and $w_m$. Under different design considerations, the input constraints to the process 500 may vary from the input considerations $K_m$, $C_m$, $N_m$, and $w_m$. The output of the process 500 includes all feasible broadcast schedules (fragmentations) that conform to delay constraints, e.g., the input constraints and/or other conditions. The process 500 starts with the base case where all segments are of equal length. Having segments of all equal length may fail with respect to the delay constraints. Thus, the process 500 gradually increases the lengths of the segments, starting at the last segment, as described further below. If the last segment, even after increased to its maximum, cannot satisfy the delay constraints, the second segment from the end can be increased, and so on. An example run of the process 500 is shown in FIG. 2.

The process 500 starts 502 with the first of the M videos (m=1) and initializes 504 the video peak rate (O) for a given broadcast series at zero for the $m^{th}$ video. O is updated as necessary later in the process 500 as feasible broadcast series are generated.

For i ranging from one to $K_m$ (the number of segments in the $m^{th}$ video), the process 500 initializes 506 all segments to an equal length, setting $s_m^i$ to one (see top row 202 in FIG. 2) and calculates 508 the maximum segment size ($X_m^i$) for the $m^{th}$ video. Each video is fragmented into $K_m$ segments and partitioned further into $G_m$ transmission groups, where $G_m$ is given by:

$$G_m = \frac{K_m}{C_m}$$

Each group includes $C_m$ segments except for the last group, which includes a number of elements given by:

$$K_m = \left(\frac{K_m}{C_m} - 1\right) \times C_m$$

Specifically, the $i^{th}$ transmission group of the $m^{th}$ video includes the segments from $S_m^{(i-1)C_m+1}$ to $S_m^{iC_m}$.

Given these definitions, the segment sizes in each group possess certain characteristics. Each segment is greater than or equal in size to the previous segment. The size of the last segment in a group equals the size of the first segment in the next group. The size of a segment in a group is an integer multiple of the size of the first segment in the group. The gradual increases are integer increments, although the increments could be non-integer. Integer increments tend to reduce the complexity of keeping segments synchronized with each other as all segments can be expressed as integer multiples of a basic unit, e.g., the first segment, $s_m^1$.

Since the size of the last segment in a group ($s_{last}$) equals the size of the first segment in the next group ($s_{last+1}$), the broadcast of these two segments starts and ends at the same time in their respective broadcast streams. Thus, $s_{last+1}$ should be accessible before the consumption of $s_{last}$. Further, the mechanism at the client used to download the smallest segment in a group, e.g., a loader, should become free by the end of downloading that that group.

The value of $X_m^i$ represents the maximum allowable length for the $i^{th}$ segment in the $m^{th}$ video that guarantees uninterrupted playout, regardless of when the $i^{th}$ segment starts broadcasting relative to other segments of the same group. Generally, $X_m^i$ represents the sum of the segment lengths before the $i^{th}$ segment in the same group as the $i^{th}$ segment. For example, if the segment units of $s_m^i$ are less than or equal to $X_m^i$, then before the consumption of $s_m^{i-1}$ (the segment before $s_m^i$ in the same group as $s_m^i$) is finished, there should be an occurrence of $s_m^i$.

$X_m^i$ is calculated as follows, for $2 \leq i \leq K_m$:

$$X_m^i = \begin{cases} 1 & i=1 \\ s_m^{i-1} & i \bmod C_m = 1 \\ s_m^{C_m\left[\frac{i}{C_m}\right]+1} + \sum_{j=C_m\left[\frac{i}{C_m}\right]+1}^{i-1} s_m^j & i \bmod C_m \neq 1 \end{cases}$$

$s_m^{C_m\left[\frac{1}{C_m}\right]+1}$ represents the first segment of the group in which segment i belongs. If $s_m^i \leq X_m^i$, each segment is guaranteed to become available, e.g., start transmission, one or more times while the preceding segments are being consumed. This definition of $X_m^i$ meets a continuity condition, even if segments are of lengths less than their corresponding $X_m^i$ (although that may not result in the most buffer-efficient approach for client-side secondary storage).

For $s_m^i = X_m^i$, the process 500 specializes to a client centric approach of periodic broadcasting. If in addition, $K_m = C_m$, then the process 500 specializes to the geometric broadcast series $\{1, 2, 4, \ldots\}$. Furthermore, as in staggered broadcast, the process 500 can use a constant W to restrict the size of the largest segment from becoming too large. If a segment is larger than W times the size of the first segment, the process 500 can force the segment to be exactly of size W.

The segments should be transmitted in such a relation to each other so that the continuity condition holds true. The continuity condition ensures that no starvation occurs at the client once the client starts to consume video data and until the end of the video. The client can download that video data from $C_m$ streams simultaneously, for $2 \leq C_m \leq K_m$. If $C_m$ equals one, then all of the segments have to be equally sized in order to guarantee the continuity condition. Immediately after the client begins to download the video segments, the user at the client can start playing back the video at its normal consumption rate of F fps in the order $S_m^1$, $S_m^2$, $S_m^3$, ..., $S_m^{K_m}$. The variable $S_m^i$ represents a set: the frames of the $i^{th}$ segment of the $m^{th}$ video, while the variable $s_m^i$ is an integer: the length of the $i^{th}$ segment of the $m^{th}$ video relative to segment $s_m^1$ equals one.

To receive and playback the data segments, the client uses ($C_m+1$) service routines: $C_m$ data loaders, $L_1, L_2, \ldots, L_{C_m}$, and one video player. A multi-threaded client multiplexes itself among these routines. Each data loader can download data at the consumption rate. The data segments are downloaded in $G_m$ rounds. During each of the $G_m$ rounds, each of the $C_m$ loaders is responsible for downloading its respective data segment in a certain transmission group, say the $r^{th}$ group, at its earliest occurrence. When the download of the current group has been completed, the loaders proceed to download the next transmission group, i.e., $(r+1)^{th}$ group, in the same manner.

Once $X_m^i$ has been calculated, the process 500 determines 510 if the second segment number ($s_m^2$) is less than the maximum segment size for the second segment ($X_m^2$).

Initially, $s_m^2$ should be less than $X_m^2$ because $s_m^2$ begins with a value of one. If $s_m^2$ is not less than $X_m^2$, then the second segment's size exceeds the maximum segment size and no additional feasible fragmentations can be generated for the $m^{th}$ video because then the second segment would not be available when all of the segments before it in the same group have been consumed. $s_m^2$ is compared with $X_m^2$ because if the last segment increased to its maximum cannot satisfy the delay constraints, an increase of the second segment from the end can start. The process 500 increments the segments (as shown from the top row 202 of the table 200 to a bottom row 204 of the table 200) until it becomes necessary to increase the second segment to more than twice the first segment. The process 500 ends there because for $(s_m^2=3) \geq X_m^2$, the continuity of the video cannot hold.

The process 500 then determines 512 if there is another video, e.g., if m is less than M. If there is not another video, the process 500 ends 514 because fragmentations have been generated for all of the M videos. If there is another video, the process considers 516 the next video by adding one to m and by following the process 500 from the initializing 504 as described above (and below).

If $s_m^2$ is less than $X_m^2$, then additional feasible fragmentations can be generated for the video and the process 500 begins to test the gradually increased segment sizes for feasible fragmentations, starting with the base case. First the process 500 determines 518 if the playout latency condition is met.

For a fragmentation to be feasible, it should guarantee a waiting delay not to exceed the playout latency, $w_m$ seconds. The variable $w_m$ indicates the amount of time it takes for a client to start receiving the first segment of a video, which is also the broadcast duration of the first segment. The process 500 considers a benchmark that indicates whether a broadcast series satisfies the playout latency. The benchmark is derived as follows.

Let $N_m^i$ indicate the number of frames in the $i^{th}$ segment of the $m^{th}$ video. The broadcast series implies that the segment sizes are:

$$N_m^i = s_m^i \times N_m^1, \; i=2, \ldots, K_m, \; m=1, \ldots, M$$

The size of the first video segment is therefore determined by:

$$N_m^1 = \frac{N_m}{\sum_{i=1}^{K_m} s_m^i}$$

Given a particular fragmentation of the video, the playout latency is bounded by the time it takes to start receiving the first segment of the video, which in turn is equal to the broadcast duration of the first segment. Let $D_m$ denote the playout latency for the $m^{th}$ video:

$$D_m = \frac{N_m^1}{F}$$

In general, for a broadcast series $\{s_m^1, s_m^2, \ldots, s_m^{K_m}\}$ where $s_m^1$ equals one, the playout latency is given by:

$$D_m = \frac{N_m}{\left(F \sum_{i=1}^{K_m} s_m^i\right)}$$

To guarantee a playout latency of $w_m$ seconds, $D_m$ should be less than $w_m$. Thus, the playout latency benchmark is:

$$\sum_{i=1}^{K_m} s_m^j \geq \frac{N_m}{FW_m}$$

If the playout latency condition is not met, then the fragmentation is not feasible. If the playout latency condition is met, then the fragmentation is feasible and the process 500 can output 520 the broadcast series for the $m^{th}$ video and calculate O(m).

Whether the broadcast series is feasible or not, the process 500 continues by incrementing 522 the length of the last segment $s_m^{K_m}$ by the length of a group-segment unit (GSU) for the group including the last segment $s_m^{K_m}$. The GSU for a group represents the size of the first segment in that group. Thus, the GSU for the group including the last segment $s_m^{K_m}$ is $$s_m^{C_m\left[\frac{K_m}{C_m}\right]+1}.$$

The process 500 proceeds to generate other fragmentations and evaluate their feasibility. Starting 524 with i equal to $K_m$, the process 500 determines 526 if the $i^{th}$ segment $s_m^i$ exceeds or equals the maximum segment size $X_m^i$. If not, then the process 500 for the $m^{th}$ video breaks and the process 500 determines 512 if there is another video and proceeds as described above.

If $s_m^i$ does exceed or equal $X_m^i$, then the $i^{th}$ segment has reached its maximum length and the process 500 determines 528 if the $(i-1)^{th}$ segment equals its GSU. In other words, the process determines if $(i-1)$ mod $C_m$ equals one. If so, then the $(i-1)^{th}$ segment has reached its maximum size, and the process increases 530 the $(i-2)^{th}$ segment by its GSU and sets 532 the $(i-1)^{th}$ segment equal to the $(i-2)^{th}$ segment. The process 500 then determines 540 if i equals two, because if i does equal two, then the process 500 has generated all the fragmentations for the $m^{th}$ video. If i does equal two, then the process 500 proceeds to determine 512 if there is another video as described above. If i is greater than two, the process 500 decreases 542 $i$ by one and determines 526 if the $i^{th}$ segment $s_m^i$ exceeds or equals the maximum segment size $X^{mi}$ and proceeds as described above. If $(i-1)$ mod $C_m$ does not equal one, then the process 500 increases 534 the $(i-1)^{th}$ segment by its GSU and performs two operations for j=i to $K_m$. The process 500 calculates 536 $X_m^j$ and sets 538 $s_m^j$ equal to $s_m^{i-1}$. The process 500 then determines 540 if i equals two and proceeds as described above. The process 500 has now generated fragmentation schemes for each of the M videos.

Figure 6:
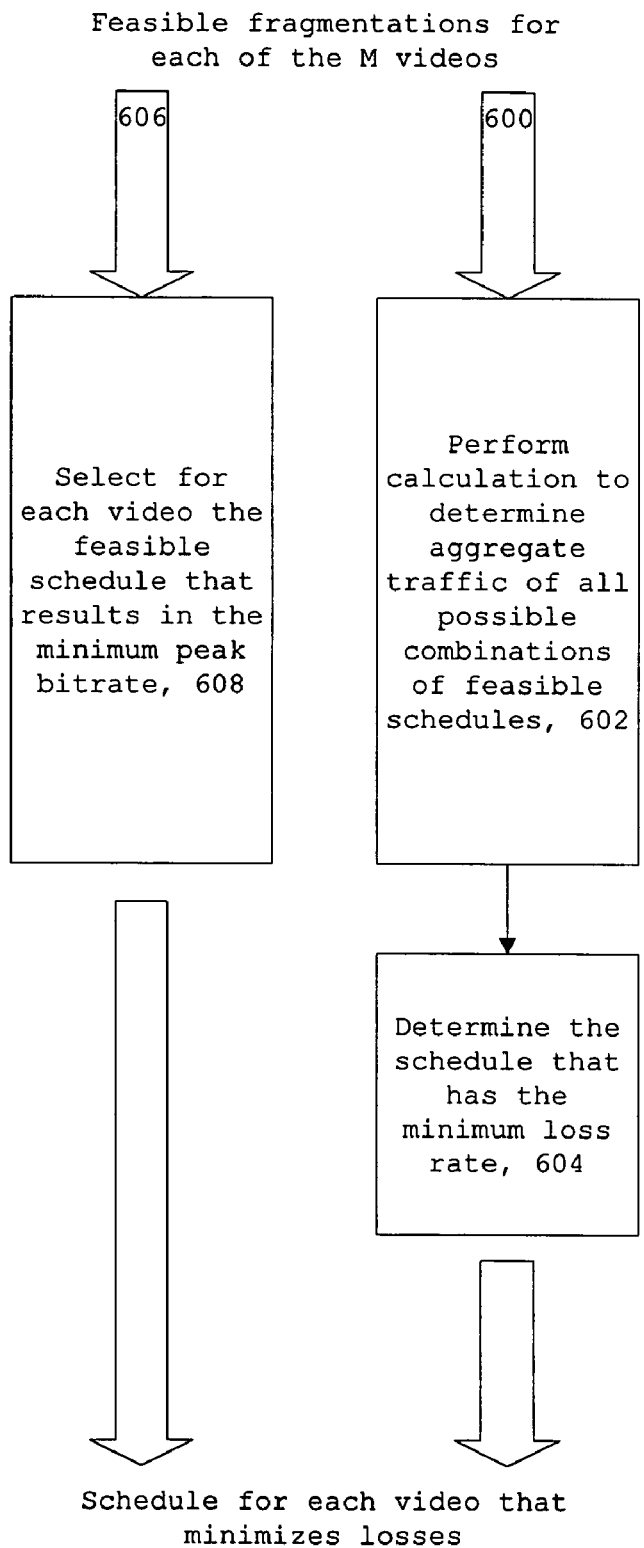
FIG. 6 shows flowcharts illustrating techniques of selecting a fragmentation schedule.

Referring to FIG. 6, given the feasible fragmentation schemes generated by the process 500, a process 600 can select the broadcast schedule for each of the M videos that reduces losses. In the bufferless multiplexor model, bits are lost from the video streams if the aggregate amount of traffic that arrives at the link carrying the videos during a time frame t exceeds the link's capacity. If $A_{i,m}^t$ indicates the actual arrival bits sent by the video stream of the $i^{th}$ segment of the $m^{th}$ video during t and if $A_t$ denotes the total arrival bits sent by all of the $\Sigma_{m=1}^M K_m$, then:

$$A_t = \sum_{m=1}^{M} \sum_{i=1}^{K_m} A_{i,m}^t$$

and $$A_{i,m}^t = f_m^j,$$

where j is given by:

$$j = \sum_{l=1}^{i-1} N_m^l + (t \bmod N_m^i)$$

The variable j stands for the index for the frame of the $m^{th}$ video that is sent during the frame time t. Thus, loss occurs in frame time t if:

$$A_t = \frac{B}{F}$$

If $P_{loss}$ denotes the long-run fraction of traffic loss, then:

$$P_{loss} = \lim_{T \to \infty} \frac{\sum_{t=1}^{T} \left(A_t - \frac{B}{F}\right)^+}{\sum_{t=1}^{T} A_t}$$

This value of $P_{loss}$ is the value that the process 600 tries to reduce. Note that $P_{loss}$ is defined in terms of data loss in units of bits because the bit loss ratio sufficiently approximates the packet loss ratio when the packets are small, e.g., if asynchronous transfer mode (ATM) cells were used as the underlying means of conveying the segments.

This computation of $P_{loss}$ can be simplified, thereby potentially reducing the computation expense of the process 600. Where LCM denotes the lest common multiple for a set of integers, $\hat{s}_m = \text{LCM}\{s_m^1, s_m^2, \ldots, s_m^{K_m}\}$ $\hat{s} = \text{LCM}\{\hat{s}_1, \hat{s}_2, \ldots, \hat{s}_M\}$ $\hat{N} = \text{LCM}\{N_1^1, N_2^1, \ldots, N_M^1\}$ $\hat{T} = \hat{s} \times \hat{N}$ Because of the periodic nature of the broadcast strategy, the aggregate traffic of the $$\sum_{m=1}^{M} K_m$$

segments is also periodic with a period of $\hat{T}$ frame times.

Given the relationship of successive segment sizes discussed above, $$LCM\{N_1^1, N_1^2, \ldots, N_1^{K_1}, N_2^1, N_2^2, \ldots, N_2^{K_2}, \ldots, N_M^1, N_M^2, \ldots N_M^{K_M}\} =$$

$$LCM\begin{Bmatrix} s_1^1 \times N_1^1, s_1^2 \times N_1^1, \ldots, s_1^{K_1} \times N_1^1, s_2^1 \times N_2^1, \\ s_2^2 \times N_2^1, \ldots, s_2^{K_2} \times N_2^1, \ldots, s_M^1 \times N_M^1, \\ s_M^2 \times N_M^1, \ldots, s_M^{K_M} \times N_M^1 \end{Bmatrix} =$$

$$LCM\{\hat{s}_1 \times N_1^1, \hat{s}_2 \times N_2^1, \ldots, \hat{s}_M \times N_M^1\} =$$

$$LCM\{\hat{s}_1, \hat{s}_2, \ldots, \hat{s}_M\} \times LCM\{N_1^1, N_2^1, \ldots, N_M^1\} = \hat{s} \times \hat{N} = \hat{T}$$

Thus, to determine the data loss rate $P_{loss}$, the traffic can just be observed during the first $\hat{T}$ frame times. Hence, given a particular selection of broadcast series for each one of the M videos, an estimate can be produced of the data loss probability in time $O(\hat{T})$.

However $P_{loss}$ is calculated, the frame sizes of the video traces need to be considered, and that explains why $f_m^i$ is input into the reducing losses stage 104 of the TAF procedure 100 (see FIG. 1). Therefore, the total space requirements for keeping the frame sizes is:

$$O(\Sigma_{m=1}^M N_m)$$

Note that CBR-encoded video can be included by keeping $f_m^i$ constant, thereby allowing the TAF procedure to produce broadcast schedules for VBR-encoded videos, CBR-encoded videos, and a mixture of VBR-encoded and CBR-encoded videos.

The process 600 performs 602 a calculation of determining the aggregate traffic of all possible combinations of feasible video schedules and determines 604 the one schedule that reduces the loss rate. For M videos, the combinations that need to be examined are:

$$\overset{M}{\underset{m=1}{\cup}} |\{F_m^i\}|$$

The calculation can be extensive, depending on the set of feasible solutions, especially if the computation of the data loss for each combination is also computationally expensive.

Instead of the potentially extensive and computationally expensive process 600, a revised process 606 can approximate the optimal selection by picking 608 one of the feasible schedules for each of the M videos, e.g., the feasible schedule that results in the minimum peak rate or the minimum gap between the peak aggregate rate and the minimal aggregate rate, depending on the real video traces to decide which criteria leads to less packet (data) loss. In this way, the aggregate traffic of all of the individual schedules is likely to produce traffic that has a small peak rate or the smoothest aggregate traffic as well, and hence small loss ratio when multiplexed. Note that in this discussion only examples with the minimal peak rate optimization are given.

Depending on the M videos, the fragmentation criteria used in selecting a feasible schedule for each one of the M videos could be different. For example, a fragmentation scheme may be chosen for a first video that leads to a low peak aggregate rate and for a second video that leads to a small gap between the peak aggregate rate and the minimal aggregate rate so as to reduce packet losses when the first and second videos are multiplexed together for simultaneous broadcast.

FIG. 7 provides a table 700 indicating the peak bit rate found for each one of ten example video traces (rows 702a-j) using the TAF process 600. See O. Rose, "Statistical properties of MPEG Video Traffic and their Impact on Traffic Modeling in ATM Systems," *Technical Report* 101, University of Wuerzburg, Germany, February 1995 for the origin of the video traces. The video traces include various types of material: feature movies, television news, sorting events, etc. The set of feasible schedules considered for the video traces (columns 704a-e) are the feasible schedules found in FIG. 2: $F_m^1, F_m^2, F_m^3, F_m^4$, and $F_m^5$ having variables: M=10, $w_m \leq 60$ seconds, $C_m=3$, $K_m=6$, $N_m=40,000$ frames, F=25 fps. The peak bit rate depends on the selection of the feasible broadcast schedule. For example, video trace talk_2 in row 702e exhibits peak bit rates from a maximum of 12.26 Mbps for $F_m^4$ in column 704d down to almost half the maximum at 6.19 Mbps for $F_m^3$ in column 704c.

The client peak values are the client peak bandwidth requirements, the peak of the aggregate traffic received by simultaneously downloading $C_m$ segments of the same group. For VBR-encoded video, the peak experienced by the client depends on the random instant at which the client started downloading a video. In other words, the client does not necessarily remain active downloading $C_m$ channels for $N_m^1 \hat{s}_m$ frame times; an entire video can be completely downloaded in less time. Thus, the reported peak bit rate for a client is a worst-case unrealistic scenario. Nevertheless, the table 700 illustrates that reduced client bandwidth is achievable by limiting the number of channels that can be simultaneously downloaded.

The selection criteria discussed here for a broadcast schedule, the schedule that exhibits a low peak bit rate or a small gap between the peak aggregate bit rate and the minimal aggregate bit rate, is a host-centric approach. A client-centric approach encouraging the selection of broadcast schedules that reduces client download bandwidth can also be used. Using a client-centric approach, however, may not always result in low bandwidth demands for the host. For example, $F_m^2$ provides the lowest client peak bit rate (7.35 Mbps) for the terminator video in row 702g, but only the third lowest host peak bit rate (10.27 Mbps).

Another approach can be to consider one or more external factors in the selection of a broadcast schedule. For example, in client systems with heterogeneous set-top boxes, a fragmentation schedule can be selected for each type of set-top box. In that way, the same video may be transmitted in two or more different fragmentation formats, one format for each set-top box type.

Figure 8:
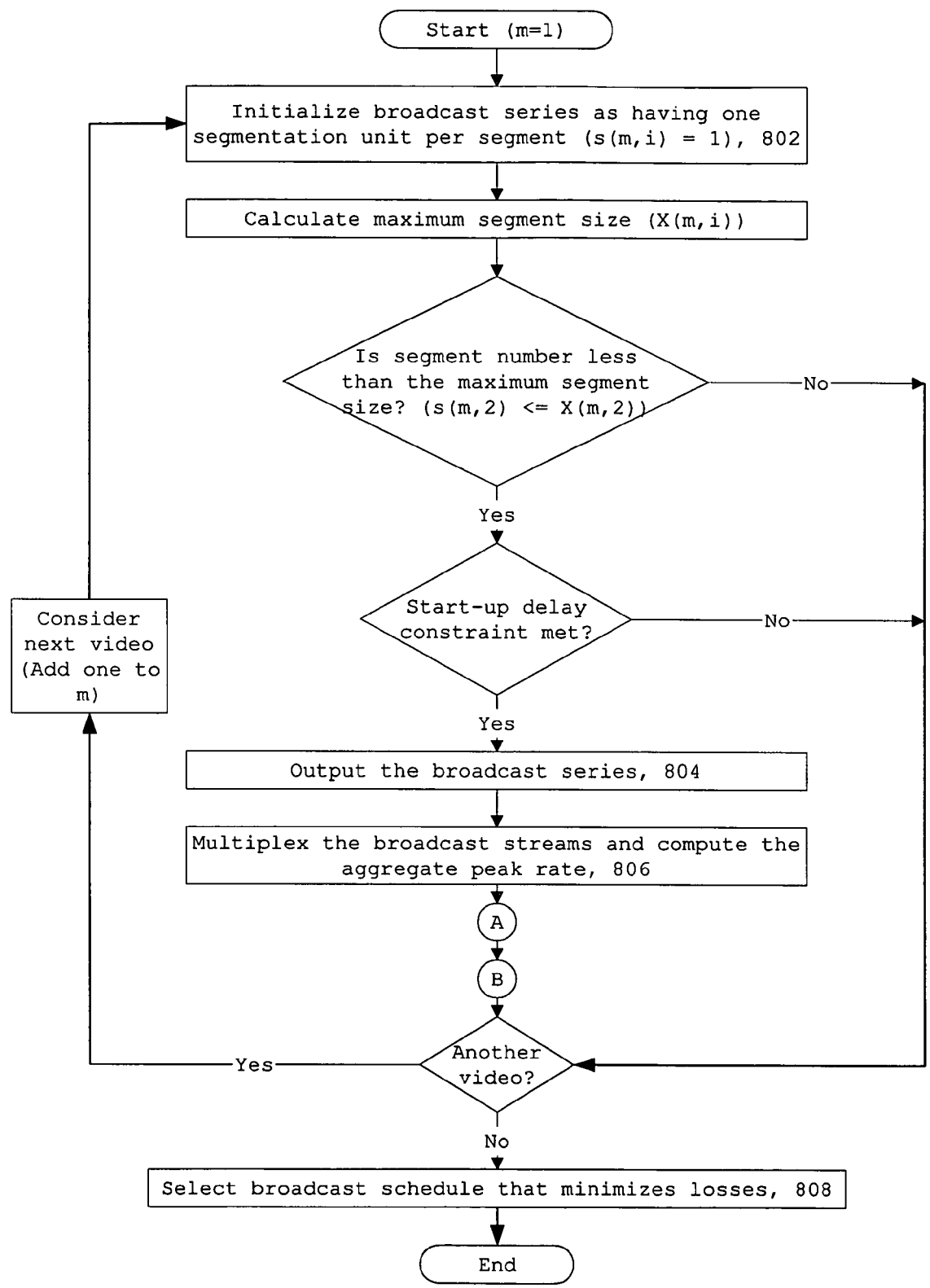
FIG. 8 is a flowchart of a fragmentation technique.

Referring to FIG. 8, a second process 800 provides an alternate TAF process. The second process 800 initializes 802 $\{s_m^1, s_m^2, \ldots, s_m^K\}$ at one. The process 800 increases $s_m^i$ in a recursive fashion from the last segment (i equals K) until the length of $s_m^i$ reaches $X_m^i$. The process 800 then increases the value of $s_m^{i-1}$, recalculates $X_m^i, \ldots, X_m^K$, and sets $s_m^{i-1} = s_m^i = \ldots = s_m^K$. The process 800 determines if the playout latency constraint is met, and if so, the process 800 outputs 804 the broadcast series and computes the aggregate peak rate when multiplexing 806 these $K_m$ broadcast streams together. The process 800 performs the section of the process 500 as shown in FIG. 5B and as explained above. The process 800 repeats from the determining until $s_m^2$ equals $X_m^2$. The process 800 then selects 808 from the feasible fragmentations the broadcast series with a reduced aggregate peak for each movie as described above, and the fragmentation of each of the M movies is finally determined.

Figure 9:
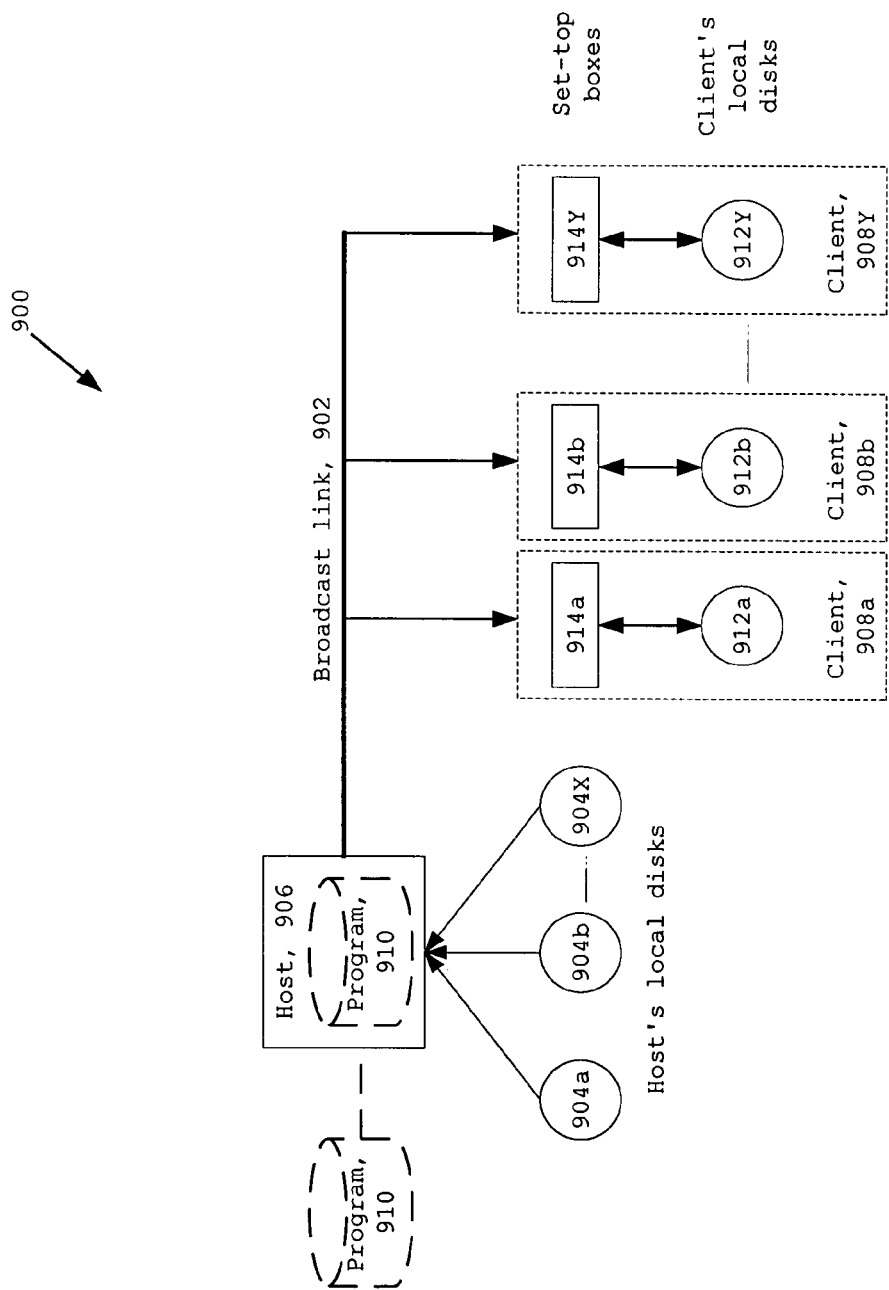
FIG. 9 is a block diagram of a network configuration.

Referring to FIG. 9, a system 900 includes a dedicated link 902 used to distribute sets of data stored at a host's local disks 904a-X from a host 906 to a set of clients 908a-Y. The broadcast link 902 can include any medium capable of electronically carrying data such as a cable, a point-to-point link, an infrared connection, a cellular link, Bluetooth, an Internet link communicating data using a protocol such as resource reservation setup protocol (RSVP), a satellite link, or other similar type of link.

When the set of clients 908a-Y requests a set of data, the host 906 performs a TAF process as described above to choose one or more broadcast schedules for the set of clients 908a-Y. The host 906, e.g., a server, may include or otherwise have access to a program 910 capable of executing the TAF process, either with software, hardware, or a combination of the two. The host 906 reads the sets of data from the host's local disks 904a-X, which can be any combination of mechanisms capable of electronically storing the sets of data, such as high-performance disk drives. Instead of using the local disks 904a-X the host 906 may itself store the sets of data. The host 906 transmits the requested set of data to the set of clients 908a-Y over the broadcast link 902.

The set of clients 908a-Y, e.g., devices capable of receiving data over the broadcast link 902, receive the set of data at their respective set-top boxes 912a-Y and/or local disks 914a-Y. The clients 908a-Y can use mechanisms other than or in addition to the set-top boxes 912a-Y and the local disks 914a-Y to receive and/or store the data, such as non-local disks, random access memory (RAM) mechanisms, peripheral component interconnect mezzanine cards (PMCs), and other similar mechanisms. (The set of data may first encounter a device such as a server and/or a gateway before reaching one or more of the clients 908a-Y). The set-top boxes 912a-Y and/or local disks 914a-Y include mechanisms capable of reading and writing the set of data. For example, the set-top boxes 912a-Y can include mechanisms such as decoders capable of processing the set of data so as to display the set of data on a display device such as a television or computer monitor or screen. Before a set-top box 912 decodes and displays the set of data transmitted by the host 906, the set of data may be cached at the set-top box's corresponding local disk 914, e.g., any combination of mechanisms capable of electronically storing the sets of data, such as high-performance disk drives. The clients 908a-Y can be configured to support additional, VCR-like operations such as fast forward, pause, and rewind once the set of data is stored at a client's local disk 912 by altering the position/rate at which data is received from the client's local disk 912.

Figure 10:
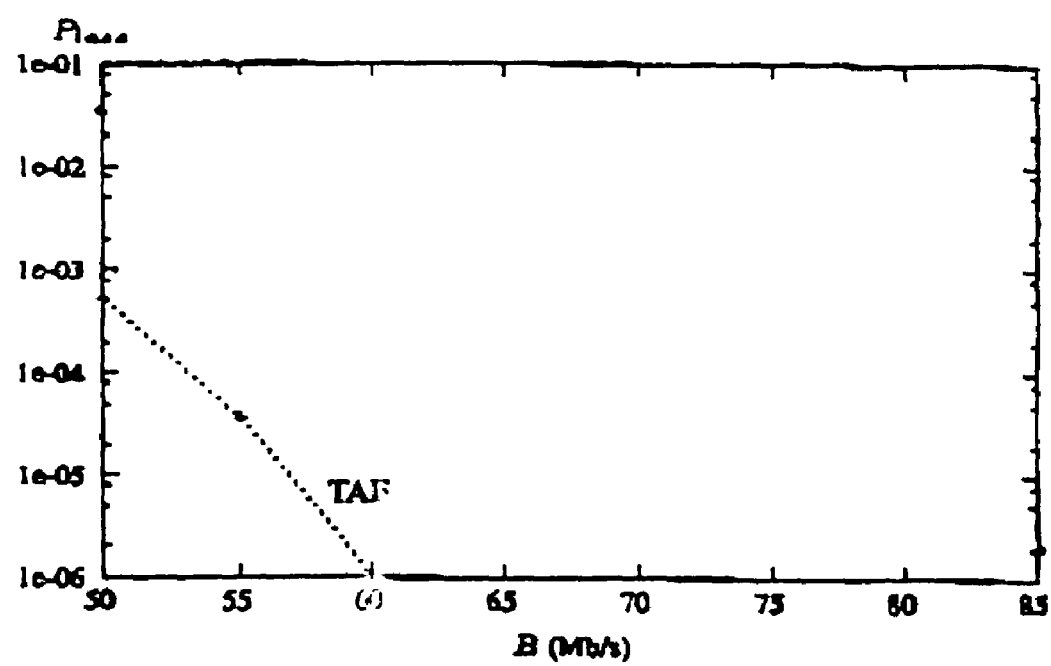
FIG. 10 is a graph showing loss rate versus bandwidth for bufferless multiplexed periodic broadcast traffic.

FIGS. 10-13 show graphs indicating the performance of the system 900 using additional processing scenarios. These additional processing scenarios may reduce the data loss provided by the TAF procedure, but may also increase jitter and delay. Referring to FIG. 10, a host bandwidth graph 1000 indicates the effect of bandwidth on performance. The data graphed shows loss rate $P_{loss}$ versus the link capacity B, varied between 50 Mbps and 85 Mbps. The ten videos of the table 700 were used, with M=10, $w_m \leq 16.5$ seconds, $C_m=K_m=7$, $N_m=40,000$ frames, and F=25 fps. Considering ten videos reflects the observed distributions of "hot set" videos, those videos that receive the most download requests, typically ranging in number from ten to twenty.

Figure 11:
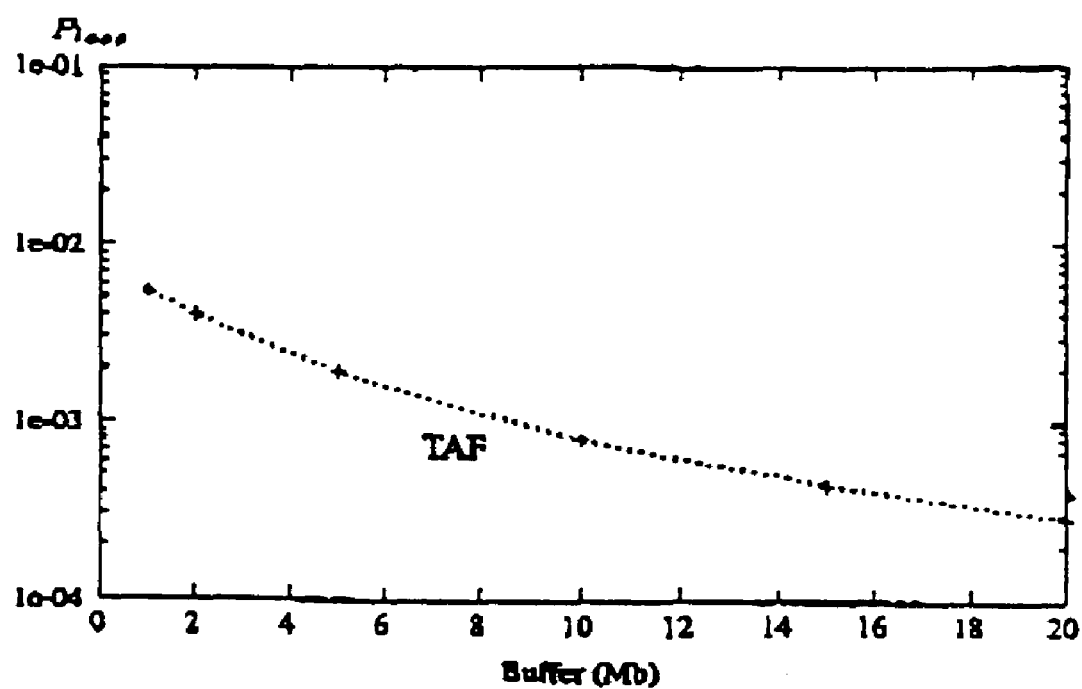
FIG. 11 is a graph showing loss rate versus buffer size for buffered multiplexed periodic broadcast traffic.

Referring to FIG. 11, a buffered multiplexing graph 1100 indicates the loss rate $P_{loss}$ versus the clients' shared buffer size (in Mb) for a scenario where the clients can buffer the video data sent by the host, i.e., all streams sent to the clients are first fed to a common buffer. The ten videos in the table 700 were used, where M=10, $w_m \leq 16.5$ seconds, $C_m=K_m=7$, $N_m=40,000$ frames, F=25 fps, and B=38 Mbps. For a large enough buffer size, no appreciable loss is present, but at the same time, arrival jitter at the clients may be increased.

Figure 12:
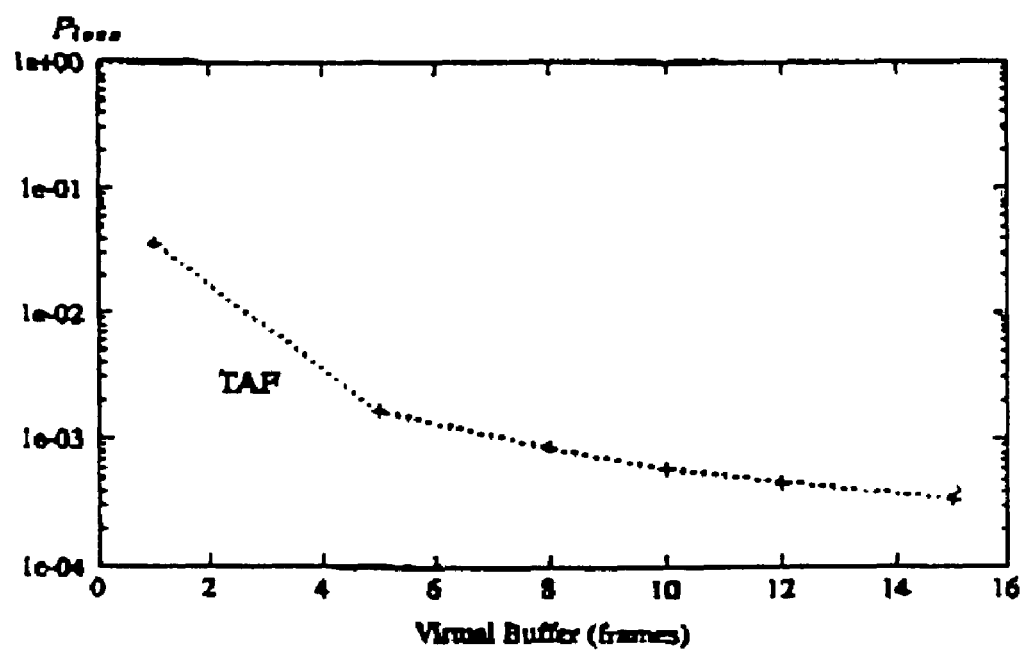
FIG. 12 is a graph showing loss rate versus buffer size for a join-the-shortest queue prefetching scheme.

Referring to FIG. 12, a prefetching graph 1200 indicates the loss rate $P_{loss}$ versus variable virtual buffer size (in frames) while using a JSQ prefetching scheme. The ten videos in the table 700 were used, where M=10, $w_m \leq 16.5$ seconds, $C_m=K_m=7$, $N_m=40,000$ frames, F=25 fps, and B=38 Mbps. A JSQ prefetching scheme can used by the host to force the clients from any ongoing video streams to prefetch video frames and to send the prefetched frames to buffers at the appropriate clients to fully utilize the shared link's bandwidth (when the link is idling due to the VBR nature of multiplexed VBR-encoded video segments). One such JSQ prefetching scheme is described in M. Reisslsin and K. Ross, "A Join-the-Shortest-Queue Prefetching Protocol for VBR Video on Demand," in *Proceedings of IEEE International Conference on Network Protocols (ICNP)*, pp. 63-72, Atlanta, Ga., October 1997. When using a JSQ scheme, it is assumed that each video stream has a virtual buffer and the video stream with the shortest queue has the highest priority to prefetch more than one frame if the aggregated bandwidth is not currently over the shared links' capacity.

Figure 13:
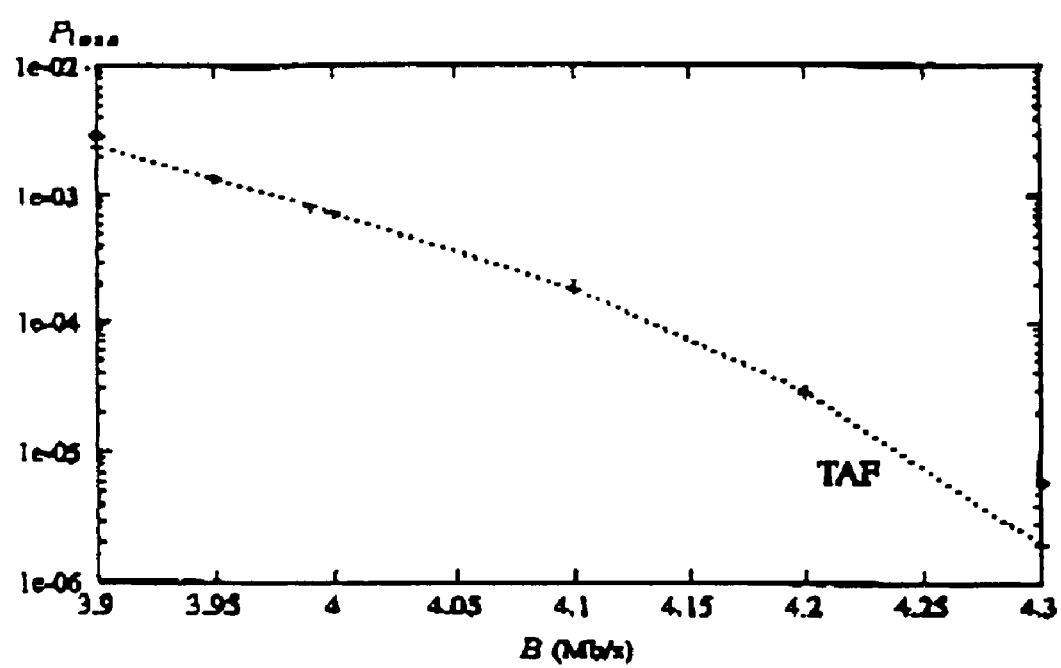
FIG. 13 is a graph showing loss rate versus bandwidth for a smoothing scheme.

Referring to FIG. 13, a smoothing graph 1300 indicates the loss rate $P_{loss}$ versus the link capacity B while using a GOP smoothing scheme over periods equal to a single GOP (twelve frames). The ten videos of the table 700 were used, with M=10, $w_m \leq 16.5$ seconds, $C_m=K_m=7$, $N_m=40,000$ frames, and F=25 fps. Smoothing can reduce the variance of the aggregate bandwidth used to transmit a video, which in turn can reduce differences between peak bit rates of the feasible fragmentation schemes.

Aspects of the present invention may be embodied as machine-readable instructions in or on machine-readable medium having embodied therein a computer program. Examples of machine-readable medium in which the computer program may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof.

Other embodiments are within the scope of the following claims.

What is claimed is:

1. A method for delivering data to a set of clients over a network by way of a communication link having a bandwidth capacity, the method comprising:

partitioning the data into a plurality of segments;

generating multiple candidate segment fragmentation schemes for broadcasting the plurality of segments to the set of clients over the communication link, each of the candidate segment fragmentation schemes representing a different schedule and being based on a characteristic of the data for broadcasting the data to the set of clients; and selecting one of the multiple candidate segment fragmentation schemes to use in said broadcasting based on whether a candidate segment fragmentation scheme contributes to reducing data loss caused by aggregate traffic in excess of the bandwidth capacity of the communication link when the segments are simultaneously transmitted over the communication link.

2. The method of claim 1 wherein the characteristic is an interval of time between a time the set of clients requests the data to a time that the data is transmitted to the set of clients.

3. The method of claim 1 wherein the characteristic is a number of streams that the set of clients can download at one time.

4. The method of claim 1 wherein the characteristic is a guarantee that the set of clients receives continuous playout of the data.

5. The method of claim 1 wherein the characteristic is a number of segments that can simultaneously be broadcast to the set of clients.

6. The method of claim 1 further comprising:
considering in selecting one of the multiple candidate segment fragmentation schemes for an item of data included in the data whether a segment fragmentation scheme provides a minimal peak aggregate rate of the data for simultaneously broadcast segments of data included in the data.

7. The method of claim 1 further comprising:
broadcasting each segment included in the selected segment fragmentation scheme to the set of clients along the communication link included in the network.

8. The method of claim 7 wherein the network includes the Internet.

9. The method of claim 1 wherein the data includes media that the set of clients can request at any time.

10. The method of claim 1 wherein the selected segment fragmentation scheme guarantees a quality of service to the set of clients.

11. The method of claim 1 wherein the data includes variable bit rate encoded data.

12. The method of claim 1 wherein the data includes constant bit rate data.

13. The method of claim 1 wherein the set of clients include devices capable of displaying the data.

14. The method of claim 1 wherein the data includes multiple frames of data.

15. The method of claim 14 wherein a sequence of the multiple frames is known prior to generating the multiple candidate segment fragmentation schemes.

16. The method of claim 14 wherein a size of each of the multiple frames is known prior to generating the multiple candidate segment fragmentation schemes.

17. The method of claim 1 wherein each of the clients in the set of clients receives the data from at least two links capable of carrying the data across a network.

18. An article comprising a machine-readable medium which stores machine-executable instructions for delivering data, the instructions causing a machine to:
partition data into a plurality of segments;
generate multiple candidate segment fragmentation schemes for broadcasting the plurality of segments to a set of clients over a communication link in a network;
consider a characteristic of the data in generating the multiple candidate segment fragmentation schemes for the plurality of segments;
select one of the multiple candidate segment fragmentation schemes to use in broadcasting the data to the set of clients for each item included in the data; and
consider in selecting one of the multiple candidate segment fragmentation schemes for an item of data included in the set of data whether a candidate segment fragmentation scheme contributes to reducing data loss caused by aggregate traffic in excess of the bandwidth capacity of the communication link when segments are simultaneously broadcast on the communication link.

19. The article of claim 18 wherein the characteristic is an interval of time between a time the set of clients requests the data to a time that the data is transmitted to the set of clients.

20. The article of claim 18 wherein the characteristic is a number of streams that the set of clients can download at one time.

21. The article of claim 18 wherein the characteristic is a guarantee that the set of clients receives continuous playout of the data.

22. The article of claim 18 wherein the characteristic is a number of segments that can simultaneously be broadcast to the set of clients.

23. The article of claim 18 further comprising instructions for causing a machine to:
consider in selecting one of the multiple candidate segment fragmentation schemes for an item of data included in the data whether a candidate segment fragmentation scheme provides a minimal peak aggregate rate of the data for simultaneously broadcast segments of data included in the data.

24. The article of claim 18 further comprising instructions for causing a machine to:
broadcast each segment included in the selected segment fragmentation scheme to the set of clients along the communication link included in the network.

25. The article of claim 24 wherein the network includes the Internet.

26. The article of claim 18 wherein the data includes media that the set of clients can request at any time.

27. The article of claim 18 wherein the selected segment fragmentation scheme guarantees a quality of service to the set of claims.

28. The article of claim 18 wherein the data includes variable bit rate encoded data.

29. The article of claim 18 wherein the data includes constant bit rate data.

30. The article of claim 18 wherein the set of clients includes devices capable of displaying the data.

31. The article of claim 18 wherein the data includes multiple frames of data.

32. The article of claim 31 wherein a sequence of the multiple frames is known prior to generating the multiple candidate segment fragmentation schemes.

33. The article of claim 31 wherein a size of each of the multiple frames is known prior to generating the multiple candidate segment fragmentation schemes.

34. The article of claim 18 wherein each of the clients in the set of clients receives the data from at least two links capable of carrying the data across a network.

35. A system comprising:
a client device configured to receive data from a network; and
a host configured to partition the data into a plurality of segments and to generate multiple candidate segment fragmentation schemes for broadcasting the plurality of segments to the client device over a communication link in the network, each candidate segment fragmentation scheme representing a different schedule for broadcasting the segments, the host executing a process that causes the host to:
consider a characteristic of the data in generating the multiple candidate segment fragmentation schemes for the plurality of segments,
select one of the multiple candidate segment fragmentation schemes to use in broadcasting the data to the client device for each item of data included in the data, consider in selecting one of the multiple candidate segment fragmentation schemes for each item of data included in the data whether a candidate segment fragmentation scheme contributes to reducing data loss caused by aggregate traffic in excess of the bandwidth capacity of the communication link when segments are simultaneously transmitted over the communication link, and transmit the data to the client device over the communication link through the network according to the segment fragmentation scheme selected for each item of data included in the data.

36. The system of claim 35 further comprising:
a storage unit accessible to the host and configured to store the data.

37. The system of claim 35 further comprising:
a storage unit accessible to the client and configured to store the data.

38. The system of claim 35 wherein the client comprises:
a display device configured to display the data.

39. The system of claim 35 wherein the characteristic is an interval of time between a time the set of clients requests the data to a time that data is transmitted to the set of clients.

40. The system of claim 35 wherein the characteristic is a number of streams that the set of clients can download at one time.

41. The system of claim 35 wherein the characteristic is a guarantee that the set of clients receives continuous playout of the data.

42. The system of claim 35 wherein the characteristic is a number of segments that can simultaneously be broadcast to the set of clients.

43. The system of claim 35 wherein the selected segment fragmentation scheme provides a minimal peak rate of aggregate traffic on the network for simultaneously broadcast segments.

44. The system of claim 35 wherein the selected segment fragmentation scheme provides a minimal gap between the peak aggregate rate of traffic on the network and the minimal aggregate rate of traffic on the network for simultaneously broadcast segments of data included in the data.

45. A method for delivering a set of data to a set of clients over a network by way of a communication link having a bandwidth capacity, the method comprising:

partitioning the set of data into a plurality of segments;

generating a plurality of candidate segment fragmentation schemes for the plurality of segments for transmitting the set of data to a client;

considering in the generating an amount of time that it takes for a first segment in an item of data included in the set of data to reach the client, a maximum number of data streams that the client can simultaneously receive, and a maximum number of data streams that a host of the set of data can transmit for each item of data included in the set of data;

selecting one of the plurality of candidate segment fragmentation schemes for each item of data included in the set of data, the selected segment fragmentation scheme for each item of data included in the set of data either providing a minimal peak rate of aggregate traffic for simultaneously broadcast segments of data included in the set of data or providing a minimal gap between a peak rate of aggregate traffic and a minimal rate of the aggregate traffic for simultaneously broadcast segments of data included in the set of data; and considering in the selecting an amount of data lost caused by aggregate traffic in excess of the bandwidth capacity of the communication link when transmitting the set of data to the client under each of the plurality of candidate segment fragmentation schemes.

* * * * *